United States Patent [19]
Gordon

[11] Patent Number: 5,546,289
[45] Date of Patent: Aug. 13, 1996

[54] LIGHTING SYSTEM FOR USE IN AN AQUARIUM

[76] Inventor: Michael D. Gordon, 2643 7th St., Apartment A, Santa Monica, Calif. 90405

[21] Appl. No.: 131,882

[22] Filed: Oct. 4, 1993

[51] Int. Cl.$^6$ ..................................................... F21V 8/00
[52] U.S. Cl. ........................... 362/101; 362/32; 362/284; 119/267
[58] Field of Search ............................... 362/31, 32, 101, 362/253, 284, 806, 808; 119/267

[56] References Cited

U.S. PATENT DOCUMENTS

| | | | |
|---|---|---|---|
| 2,443,510 | 6/1948 | McCallum | 362/284 |
| 3,609,343 | 9/1971 | Howlett | 362/32 |
| 3,791,058 | 2/1974 | Mollica | 362/811 |
| 4,175,513 | 11/1979 | Roehrick | 119/246 |
| 4,280,122 | 7/1981 | McKinley et al. | 362/32 |
| 4,516,529 | 5/1985 | Lotito et al. | 119/253 |
| 4,617,251 | 10/1986 | Johansson | 362/32 |
| 4,703,720 | 11/1987 | Shipman et al. | 119/261 |
| 4,807,092 | 2/1989 | Hasegawa | 362/32 |
| 4,957,623 | 9/1990 | Henzlik | 119/264 |
| 4,974,545 | 12/1990 | Jones | 119/256 |
| 4,975,809 | 12/1990 | Ku | 362/31 |
| 5,000,118 | 3/1991 | Merritt et al. | 119/246 |
| 5,179,911 | 1/1993 | Chow et al. | 119/264 |

FOREIGN PATENT DOCUMENTS

| | | | |
|---|---|---|---|
| 2437580 | 11/1975 | Germany | 362/32 |
| 2199130 | 6/1988 | United Kingdom | 362/32 |

Primary Examiner—Ira S. Lazarus
Assistant Examiner—Sara Sachie Raab
Attorney, Agent, or Firm—W. Edward Johansen

[57] ABSTRACT

A lighting system includes a light source, a floor plate with holes and optical fibers one of which is mechanically and optically coupled to one of the holes. The light source includes an enclosure coupled, a light system fixedly coupled to the enclosure, a cylinder, which is hollow and transparent and which has an outer sidewall, concentrically aligned with the light system and rotatably coupled to the enclosure, a plurality of bands of tape, which are transparent, concentrically aligned with the light system and serially disposed on the outer sidewall of the cylinder and a drive system fixedly coupled to the enclosure and mechanically coupled to the cylinder in order to rotate it. The light system generates an output of light. The output of light passes through the outer sidewall. Each optical fiber is optically coupled to the light source at a second end thereof. Either opaque markings or transparent markings, each of which is of a color which is selected from a group of colors, are distributed on the bands of tape.

5 Claims, 3 Drawing Sheets

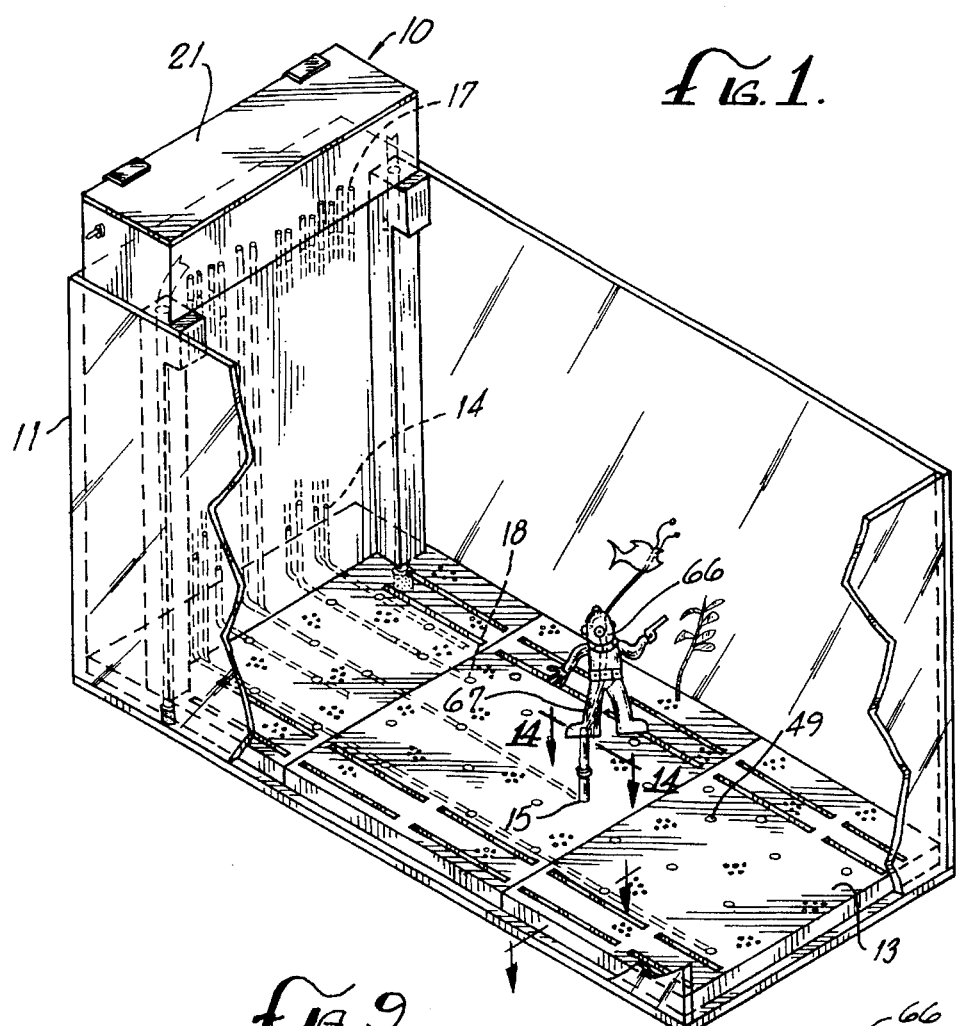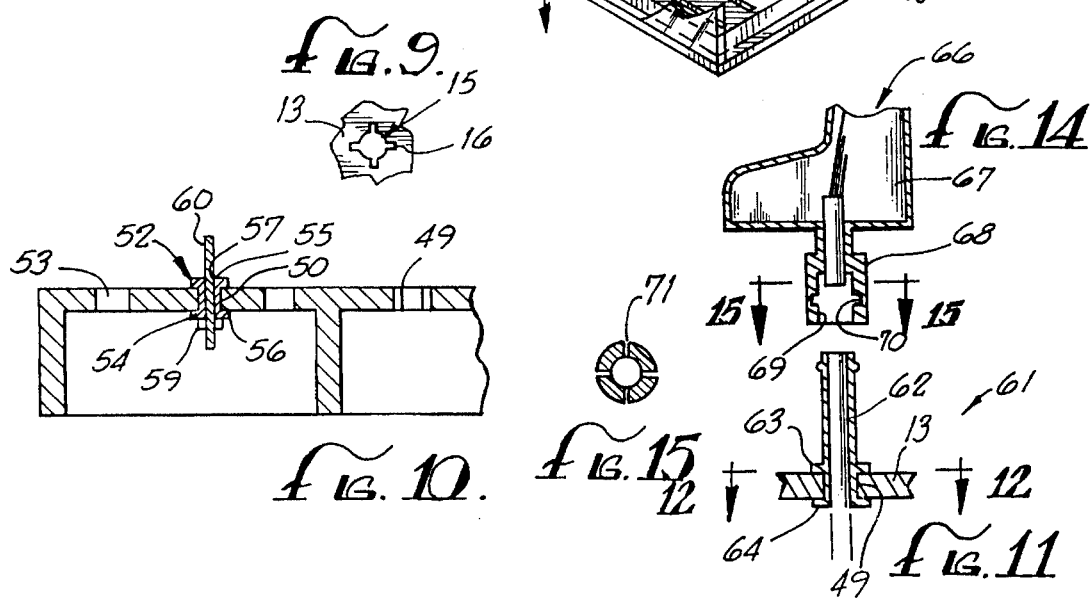

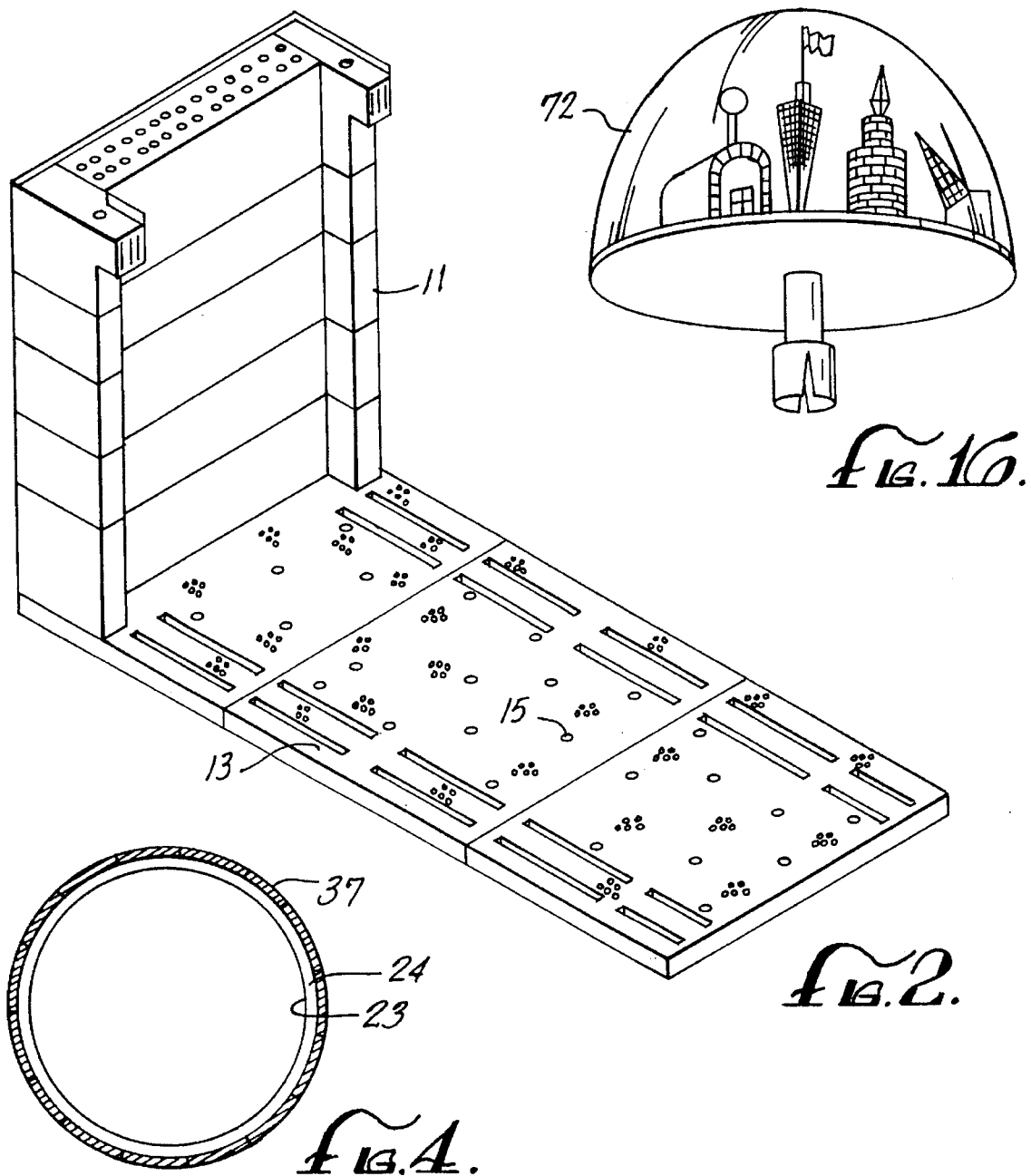

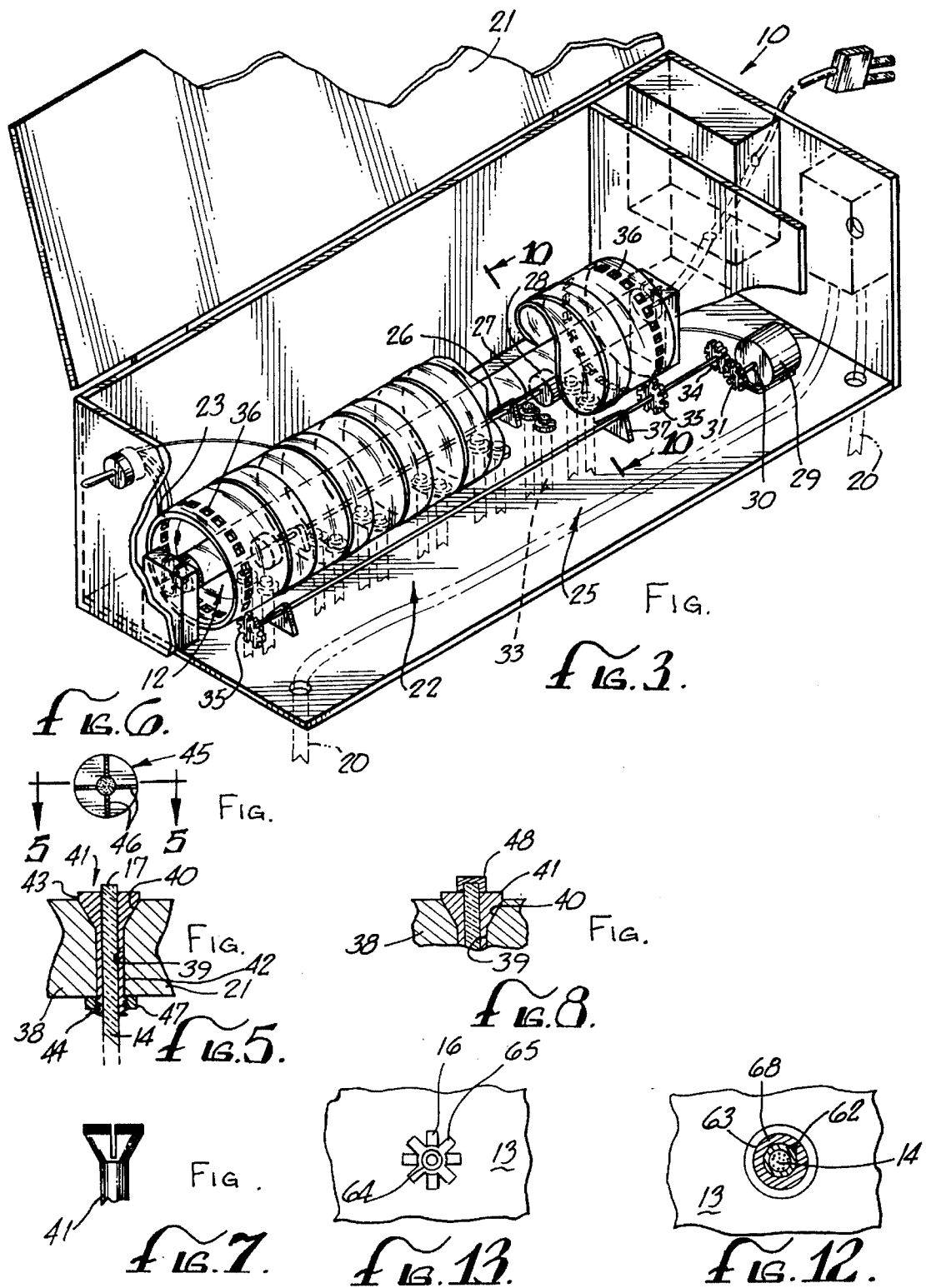

LIGHTING SYSTEM FOR USE IN AN AQUARIUM

BACKGROUND OF THE INVENTION

The field of the invention is a lighting system for use in aquariums, terrariums, bird cages, landscaping and archetectural models.

U.S. Pat. No. 5,179,911 teaches an aquarium which includes a housing, a screen, a tank for containing water and a conduit coupling the tank to the housing. The screen is disposed on a lower portion of the housing so that a space is formed below the screen.

U.S. Pat. No. 4,957,623 teaches an aquarium cleaning system which includes an undergravel cleaning apparatus and a fish tank having a bottom wall and side and end walls. The cleaning apparatus includes a rectangular frame having side and end walls sized to fit within the bottom portion of the tank. An apertured gravel-supporting floor plate is mounted on the top of the frame and defines a space within the frame beneath the floor plate. A stationary guide tube extends upwardly from the frame above the floor plate. A movable suction head is located within the space and is connected to a movable siphon tube extending upwardly through the guide tube. An upstanding aeration tube is mounted on the floor plate and has a coaxial air supply tube which supports an apertured wiper disc and an apertured filter cartridge, both having wiper elements engaged with the inside wall of the aeration tube to remove algae and detritus. The floor plate includes two grid sections with parallel slits. The lower section is movable to vary the degree of registration of the slits between fully opened and fully closed modes for special purposes.

U.S. Pat. No. 4,974,545 teaches an ornamental device for use in fluid-filled viewing tanks. The ornamental device enhances the aesthetic nature of the tank which has a decorative body member and an affixed retaining member for semi-permanently securing the ornamental device to an inner surface of the viewing tank.

U.S. Pat. No. 5,000,118 teaches an aesthetically pleasing aquatic/terrestrial display unit which provides a variety of novel optical effects. These novel optical effects include the illusion whereby aquatic and terrestrial environments are superimposed, sometimes with their geometrical relationships seemingly altered by attendant lensing effects.

U.S. Pat. No. 4,175,513 teaches a lighting and lightscaping system for use in aquariums and terrariums which includes a light chamber with removable drawers, light bulbs, a source of electrical current, normally open switches and ornamental sculptures. The light bulbs are contained in the removable drawers. The normally open switches close when the light drawers are closed in order to electrically couple the source of electrical current to the light bulbs. The ornamental sculptures dispenses light from the light chamber to the aquariums and terrariums.

U.S. Pat. No. 4,516,529 teaches an aquarium for housing fish and other aquatic life which is formed within a pyramidal housing. The upper portion of the pyramidal housing is formed of transparent triangular walls which enclose the water for the fish while permitting viewing of the fish. The lower portion of the pyramidal housing serves as a base for supporting the water, and includes a drawer which holds filtration, heating and aeration equipment while permitting ready access for servicing of the equipment. An internal pyramidal light is situated at the apex of the pyramidal housing within the walls and provides lighting. The location permits lighting of the entire water surface without any significant heating of the walls. All plumbing connections for treatment of the water are made through the floor of the chamber holding the water, thereby avoiding the presence of unsightly hoses and tubing. By the placing of the filtering equipment below the water chamber, the filtering system is able to self-prime, thereby eliminating the process of siphoning in the caring of the aquarium.

U.S. Pat. No. 4,703,720 teaches an upwardly opening aquarium tank which includes an outwardly convex partial spherical bottom wall. A base includes a standard portion of large cross-sectional area defining an upwardly opening pressure chamber. The standard portion includes a peripheral wall structure from whose upper marginal portion the bottom wall of the tank is supported. A seal structure forms a fluid tight seal between the tank bottom wall and the standard portion. The bottom wall includes air inlet check valve structure opening therethrough by which pressurized air from the pressure chamber may be admitted into the interior of the lower portion of the tank through the bottom wall thereof. The base includes an air pump for supplying air under pressure to the pressure chamber and a light diffusing filter panel is supported from the valve structure and overlies the bottom wall in spaced relation relative thereto. A source of illumination is contained within the pressure chamber and is operative to cast light upwardly through the tank bottom wall and the light diffusing filter panel.

U.S. Pat. No. 4,975,809 teaches that the visual attractiveness of a variety of otherwise-autonomous articles may be significantly enhanced through the inclusion of an apertured, internally light-transmissive essentially solid and preferably, peripherally light reflectively coated panel which is edge-illuminated and energized by elements self-contained within the article body. The article may include greeting cards, key-chain medallions, campaign buttons, tree ornaments, dolls and picture-carrying plaques. Article apertures of distributed area, point size or both may be thusly illuminated. Distributed-area display effects may be enhanced through aperture-aligned light-concentrative discontinuities formed in the panel. Enchancement of point-display effects may similarly be achieved through point-aperture-aligned, light-concentrative point discontinuities likewise formed in the panel. Point effects may also be enhanced through the employment of an end-illuminated, aperture-aligned, point-discontinuous optical fiber in conjunction with a subject apertured panel. Bi-directional display effects in subject autonomous articles may be achieved by means of a layered panel having oppositely-projective surfaces. For realizations where increased article thickness is tolerable, color-variation effects may be achieved by the inclusion of an illuminating optical-fiber array whose input ends are themselves illuminated through a multicolored filter ring rotatably-interposed in front of an originating light source.

U.S. Pat. No. 4,617,751 teaches fishing tackle for catching fish with a fishing line which constitutes a light guide, at one end of which the light from a natural or artificial light source can be focused, and at the other end of which a bait with reflecting, luminescent, transmittent or light-scattering properties is located. The fishing tackle also includes an opto-electronic energy transformer, an electric energy storage circuit, an optic beam splitter and a light detector.

SUMMARY OF INVENTION

The present invention is directed to a lighting system including a floor plate and a light source. The light source is coupled to the floor plate.

In a first separate aspect of the invention the lighting system includes a plurality of optical fibers. Each optical fiber has a first end and a second end and is optically coupled to the light source at its first end. The floor plate has a surface with a plurality of holes to at least one of which one of the optical fibers is mechanically and optically coupled at its second end.

In a second separate aspect of the invention the light source includes an enclosure, a light system and a cylinder. The light system is fixedly coupled to the enclosure and generates an output of light. The cylinder is hollow, transparent and is concentrically aligned with the light system and has an outer sidewall through which the output of light passes.

In a third separate aspect of the invention the cylinder is rotatably coupled to the enclosure. A drive system is fixedly coupled to the enclosure and is mechanically coupled to the cylinder in order to rotate it.

In a fourth separate aspect of the invention a plurality of bands of transparent tape are concentrically aligned with the light system and are serially disposed on the outer sidewall of the cylinder. A plurality of opaque markings are distributed on the bands of transparent tape creating an on/off pattern of light which passes through each of the bands of transparent tape.

In a fifth separate aspect of the invention a plurality of bands of transparent tape the bands of transparent tape are concentrically aligned with the light system and are serially disposed on the outer sidewall of the cylinder. A plurality of transparent markings, each of which is of a color which is selected from a group of colors, are distributed on the bands of transparent tape creating a varying color pattern of light which passes through each of the bands of transparent tape.

In a sixth separate aspect of the invention a figure is coupled to the floor plate and is optically coupled to one of the optical fibers at the second end thereof through one of the holes in the floor plate.

Other aspects and many of the attendant advantages will be more readily appreciated as the same becomes better understood by reference to the following detailed description and considered in connection with the accompanying drawing in which like reference symbols designate like parts throughout the figures.

The features of the present invention which are believed to be novel are set forth with particularity in the appended claims.

DESCRIPTION OF THE DRAWING

FIG. 1 is a partial perspective drawing of a lighting system which is for use in an aquarium, which has a housing and two upstanding aeration tubes which are disposed in the housing, and which includes a floor plate which has a plurality of plant mounting holes, a plurality of water-return slots and a plurality of stem mounting holes and a plurality of optical fibers which are disposed in the housing, a light source which is coupled to the housing, a housing, a floor, a figure which has a stem connector and a figure mounting stem is coupled to the floor plate according to the present invention.

FIG. 2 is a perspective drawing of the optical fibers, the upstanding aeration tube and the floor plate of FIG. 1.

FIG. 3 is a partial perspective drawing of the light source of FIG. 1 which includes an enclosure having a plurality of fiber mounting holes, a light system, a cylinder, bands of tape and a drive system.

FIG. 4 is cross-section view of the cylinder of FIG. 3 along the line 4—4 of FIG. 3.

FIG. 5 is a partial side view in cross-section of the enclosure of FIG. 1 which includes one of a plurality of fiber holders which is disposed in one of the fiber mounting holes taken along line 5—5 of FIG. 6 and in which one of the optical fibers of FIG. 1 is disposed.

FIG. 6 is a top plan view of one of the fiber holders of FIG. 5 and the enclosure of FIG. 1.

FIG. 7 is a partial perspective drawing of one of the fiber holders of FIG. 5.

FIG. 8 is a partial side view in cross-section of the floor plate of FIG. 1 which includes one of a plurality of fiber holders which is disposed in one of the fiber mounting holes taken along line 5—5 of FIG. 6 and in which one of the optical fibers of FIG. 1 is disposed and has a transparent cap of a color covering a first end thereof.

FIG. 9 is a top plan view of one of the stem mounting holes in the floor plate of FIG. 1.

FIG. 10 is a partial side view in cross-section of the floor plate of FIG. 1 taken along line 10—10 of FIG. 1 which includes one of the stem mounting holes, two of the water return slots, one of the plant mounting holes and one of a plurality of plant holders which is disposed in one of the plant mounting holes.

FIG. 11 is a side view in cross-section of the floor plate and the figure mounting stem of FIG. 1.

FIG. 12 is a transverse cross-sectional view of the floor plate and the figure mounting stem of FIG. 11 taken along 12—12 of FIG. 11.

FIG. 13 is a partial bottom plan view of the floor plate and the figure mounting stem of FIG. 1.

FIG. 14 is a partial side view in cross-section of the figure with the stem connector of FIG. 1.

FIG. 15 is a transverse cross-sectional view of the stem connector of FIG. 1 taken along 15—15 of FIG. 14.

FIG. 16 is a perspective drawing of a model of an underwater city.

DESCRIPTION OF THE PREFERRED EMBODIMENT

Referring to FIG. 1 in conjunction with FIG. 2 a lighting system 10 includes a housing 11, a light source 12, a floor plate 13 and a plurality of optical fibers 14. The floor plate 13 has a plurality of stem mounting holes 15 having four slots 16 which are radially spaced apart by ninety degrees. Each optical fiber 14 has a first end 17 and a second end 18. The lighting system 10 is used with an aquarium 19 has an upstanding aeration tube 20.

Referring to FIG. 3 in conjunction with FIG. 1 and FIG. 4 the light source 12 includes an enclosure 21, a light system 22 and a cylinder 23. The enclosure 21 is coupled to the housing 11. The light system 22 is fixedly coupled to the enclosure 21. The cylinder 23 is hollow and transparent and has an outer sidewall 24 and is concentrically aligned with the light system 22. The light system 22 generates an output of light. The output of light passes through the outer sidewall 24 of the cylinder 23.

Referring to FIG. 3 the light source 12 also includes a drive system 25 which includes a pair of first mounts 26, a first rod 27 and a pair of rubber discs 28. The pair of first mounts 26 are fixedly coupled to the floor plate 13. The first rod 27 is disposed parallel to the cylinder 23 and is rotatively coupled to the pair of first mounts 26. The pair of rubber discs 28 are fixedly coupled to the first rod 27 adjacent to each end thereof. The drive system 25 also includes a motor 29 with a shaft 30, a first drive gear 31, a pair of second mounts 32, a second rod 33, a second drive gear 34 and a pair of third drive gears 35. The motor 29 and the pair of second mounts 32 are fixedly coupled to the floor plate 13. The second rod 33 is disposed parallel to the cylinder 23 and is rotatively coupled to the pair of second mounts 32. The first drive gear 31 is fixedly coupled to the shaft 30 of the motor 29. The second drive gear 34 is fixedly coupled to the second rod 33 adjacent the one end thereof. The pair of third drive gears 35 are fixedly coupled to the second rod 33 adjacent the other end thereof and the second drive gear 34, respectively. The cylinder 23 has a plurality of notches 36 at each end thereof. The notches 36 at each end engage the teeth of one of the pair of third drive gears 35. The cylinder 23 is rotatably coupled to the enclosure 21 by the drive system 25 which rotates it.

Referring to FIG. 4 in conjunction with FIG. 3 a plurality of bands 37 of tape, which are transparent, are concentrically aligned with the light system 22 and serially disposed on the outer sidewall 24 of the cylinder 23. A plurality of markings 38, either opaque or transparent and of a color which is selected from a group of colors, are distributed on the bands 37 of tape in order to generate either an on/off pattern of light or a varying color pattern of light, respectively, which passes through each band 37 of tape.

Referring to FIG. 5 in conjunction with FIG. 6 the enclosure has bottom side 38 which has a plurality of fiber mounting holes 39 which has a tapered top opening 40. Each of a plurality of fiber holders 41 is disposed in one of the fiber mounting holes 39.

Referring to FIG. 6 in conjunction with FIG. 5 and FIG. 7 each fiber holder 41 is a hollow member 42 with a first end 43 and a second end 44. A head 45 with four slits 46 radially spaced-apart by ninety degrees is disposed at the first end 43. The head 45 is in the shape of an inverted truncated cone. A nut 47 is threadedly coupled to the hollow member 42 at the second end 44 thereof. One of the optical fibers 14 is slidably inserted into each fiber holder 41. The nut 47 is threadedly tighten the tapered top opening 40 compresses the head 45 in order to secure the optical fiber 14 therein.

Referring to FIG. 8 in conjunction with FIG. 5 one of a plurality caps 48 may cover the first end 17 of each optical fiber 14. Each cap 48 may be either transparent or opaque. Each cap 48 may also be of a color which is selected from a group of colors including red, green, blue and yellow.

Referring to FIG. 9 in conjunction with FIG. 1 and FIG. 10 the floor plate 13 has a plurality of stem mounting holes 49, a plurality of plant mounting holes 50 each of which has a tapered top opening 51, a plurality of plant holders 52 and a plurality of water return slots 53. Each plant holder 52 is a hollow member 54 with a first end 55 and a second end 56. A head 57 with four slits 58 radially spaced-apart by ninety degrees is disposed at the first end 55. The head 57 is in the shape of an inverted truncated cone. A nut 59 is threadedly coupled to the hollow member 54 at the second end 56 thereof. A stem 60 of a plastic plant is slidably inserted into each fiber holder 52. The nut 59 is threadedly tighten the tapered top opening 51 compresses the head 57 in order to secure the stem 60 of the plant therein.

Referring to FIG. 11 in conjunction with FIG. 12 and FIG. 13 a figure mounting stem 61 is a tube 62 which has a first flange 63 at a first end. The tube 62 also has a second flange 64 at a second end. Four projections 65 are disposed adjacent to the second flange 64 and are radially spaced-apart by ninety degrees. The figure mounting stem 61 is slidably inserted into one of the stem mounting holes 49.

Referring to FIG. 14 in conjunction with FIG. 1 and FIG. 15 a FIG. 66 has a base 67 and a stem connector 68 which is couped to its base 67. The stem connector 68 has a clindrical cavity 69 with a groove 70 and four slits 71 radially spaced-apart by ninety degrees. The stem connector 68 is slidably inserted onto the figure mounting stem 61 to compress it in order to secure the optical fiber 14 therein. The groove 70 of the cylindrical cavity 69 enages the first flange 63 of the figure mounting stem 61.

Referring to FIG. 16 in conjunction with FIG. 1 and FIG. 15 the FIG. 66 is coupled to the floor plate 13 and is optically coupled to one of the optical fibers 14 at the second end 18 thereof. A model 72 of an underwater city may be coupled to the floor plate 13 and optically coupled to one of the optical fibers 14 at the second end 18 thereof.

From the foregoing it can be seen that a lighting system for use in an aquarium has been described. It should be noted that the sketches are not drawn to scale and that distance of and between the figures are not to be considered significant. Accordingly it is intended that the foregoing disclosure and showing made in the drawing shall be considered only as an illustration of the principle of the present invention.

What is claimed is:

1. An aquarium with a lighted figure comprising:
   a. a light system fixedly coupled to said aquarium, said light system generating an output of light;
   b. a cylinder concentrically aligned with said light system, said cylinder being hollow, transparent and having an outer sidewall through which said output of light passes, said cylinder being rotatably coupled to said aquarium;
   c. a drive system fixedly coupled to said aquarium and mechanically coupled to said cylinder in order to rotate said cylinder;
   d. a plurality of optical fibers, each of which has a first end and a second end, optically coupled to said light system at said first ends thereof;
   e. a floor plate having a surface with a plurality of holes to at least one of which one of said optical fibers is mechanically and optically coupled, said floor plate being coupled to said aquarium;
   f. a figure coupled to said floor plate and optically coupled to said optical fiber at said second end thereof.

2. A housing with a lighted figure according to claim 1 wherein said light system further includes:
   a. a plurality of bands of transparent tape each of said bands being concentrically aligned with said light system and serially disposed along side each other on said outer sidewall of said cylinder; and
   b. a plurality of opaque markings distributed on said bands of transparent tape whereby an on/off pattern of light passes through each of said bands of transparent tape.

3. A lighted housing according to claim 1 wherein said light system further includes:
   a. a plurality of bands of transparent tape each of said bands being concentrically aligned with said light system and serially disposed along side each other on said outer sidewall of said cylinder; and
   b. a plurality of transparent markings, each of which is of a color which is selected from a group of colors, distributed on said bands of transparent tape whereby a varying color pattern of light passes through each of said bands of transparent tape.

4. A lighting system comprising:

a. an enclosure;

b. a light system fixedly coupled to said enclosure, said light system generating an output of light;

c. a cylinder concentrically aligned with said light system, said cylinder being hollow, transparent and having an outer sidewall through which said output of light passes, said cylinder being rotatably coupled to said enclosure;

d. a drive system fixedly coupled to said enclosure and mechanically coupled to said cylinder in order to rotate said cylinder;

e. a plurality of optical fibers, each of which has a first end and a second end, optically coupled to said light system at said first ends thereof;

f. a floor plate having a surface with a plurality of holes to at least one of which one of said optical fibers is mechanically and optically coupled, said floor plate being coupled to said enclosure;

g. a plurality of bands of transparent tape each of said bands being concentrically aligned with said light system and serially disposed along side each other on said outer sidewall of said cylinder; and h. a plurality of opaque markings distributed on said bands of transparent tape whereby an on/off pattern of light passes through each of said bands of transparent tape.

5. A lighting system comprising:

a. an enclosure;

b. a light system fixedly coupled to said enclosure, said light system generating an output of light;

c. a cylinder concentrically aligned with said light system, said cylinder being hollow, transparent and having an outer sidewall through which said output of light passes, said cylinder being rotatably coupled to said enclosure;

d. a drive system fixedly coupled to said enclosure and mechanically coupled to said cylinder in order to rotate said cylinder;

e. a plurality of optical fibers, each of which has a first end and a second end, optically coupled to said light system at said first ends thereof;

f. a floor plate having a surface with a plurality of holes to at least one of which one of said optical fibers is mechanically and optically coupled, said floor plate being coupled to said enclosure;

g. a plurality of bands of transparent tape each of said bands being concentrically aligned with said light system and serially disposed along side each other on said outer sidewall of said cylinder; and h. a plurality of transparent markings, each of which is of a color which is selected from a group of colors, distributed on said bands of transparent tape whereby a varying color pattern of light passes through each of said bands of transparent tape.

* * * * *